United States Patent [19]

Karkota, Jr.

[11] Patent Number: 5,023,933
[45] Date of Patent: Jun. 11, 1991

[54] SUPERHETERODYNE SCA RECEIVER AND METHOD FOR THE MANUFACTURE THEREOF

[76] Inventor: Frank P. Karkota, Jr., Cowdry Hill Rd., P.O. Box 3251, Westford, Mass. 01886

[21] Appl. No.: 257,512

[22] Filed: Oct. 13, 1988

[51] Int. Cl.$^5$ .............................................. H04B 1/10
[52] U.S. Cl. ...................................... 455/45; 455/307; 455/339
[58] Field of Search ................. 455/45, 206, 214, 200, 455/266, 339, 307; 333/178; 370/110.4

[56] References Cited

U.S. PATENT DOCUMENTS

| | | | |
|---|---|---|---|
| 4,517,562 | 5/1985 | Martinez | 455/45 |
| 4,620,226 | 10/1986 | Cheung | 358/198 |
| 4,658,438 | 4/1987 | Kamata et al. | 455/192 |
| 4,660,193 | 4/1987 | Young et al. | 455/45 |
| 4,674,121 | 6/1987 | Miura et al. | 381/10 |
| 4,692,726 | 9/1987 | Green et al. | 333/202 |
| 4,713,808 | 12/1987 | Gaskill et al. | 370/93 |
| 4,816,769 | 3/1989 | Ma et al. | 375/82 |

Primary Examiner—Reinhard J. Eisenzopf
Assistant Examiner—Edward Urban
Attorney, Agent, or Firm—Robert K. Tendler

[57] ABSTRACT

An SCA receiver is provided which has a close to ideal passband characteristic which greatly improves frequency response to produce a brighter sound due to the use of ceramic resonator elements. The use of ceramic resonator elements and a superheterodyne approach also provides a receiver which can be rapidly aligned and which has improved noise protection, lower distortion, increased stability, less residual subcarrier in the audio, and more consistent performance from one unit to the next. In one embodiment the superheterodynes circuit operates at 455 kHz which up-converts the usual 67 kHz signal by mixing it with the output of a ceramic resonator controlled local oscillator/mixer. The ceramic resonator and ceramic filter along with the local oscillator/mixer I.C. provides low group delay, improved impulse noise rejection, while most importantly achieving at least an order of magnitude better audio response over the signal bandwidth. Moreover, in the manufacturing process, complicated alignment is eliminated which decreases the alignment time from as much as two hours to typically under two minutes.

9 Claims, 3 Drawing Sheets

SUPERHETERODYNE SCA RECEIVER AND METHOD FOR THE MANUFACTURE THEREOF

FIELD OF INVENTION

This invention relates to improved superheterodyne SCA receivers and more particularly to the utilization of ceramic resonator elements which provides for complete tailoring of the passband response of the receiver for improved frequency response, and also provides for an improved method for the alignment of the receiver.

BACKGROUND OF THE INVENTION

Subsidiary Communication Authorization or SCA receivers refer to a process of multiplexing an additional program on an FM broadcast station transmission in such a manner that this additional program cannot be heard by the casual listener, but rather is demodulated through the utilization of a specialized receiver so that it can be heard by a special limited group of recipients.

The original and most common use for such transmissions is background music which is transmitted as a subcarrier on an FM broadcast. While background music has been in existence for a number of years, the technology has evolved into numerous other forms of narrowcasting, as opposed to broadcasting. It will be appreciated that a broadcast is intended for general listenership, whereas a narrowcast is intended for a limited audience who pays for the service.

Typically in order to generate the SCA format a specialized generator is required at the transmitter site which is called a multiplexer generator and typically imposes a low amplitude supersonic tone which is frequency modulated by the program to be transmitted. Most commonly the frequency utilized for the supersonic tone is 67 kHz, although in the past 41 kHz has been used. However since 41 kHz signals have been preempted by stereo broadcasting, other frequencies are now utilized for SCA systems. In addition to 67 kHz, 92 kHz is often used. FCC regulations now permit the use of any frequency band within 53 kHz and 99 kHz.

With respect to the fidelity of such SCA broadcasts, the audio bandwidth does not typically exceed 5 kHz, with the spectrum occupied being typically about 15 kHz.

Prior Superheterodyne SCA Receivers

In the past SCA receivers were essentially a modified two way radio type receiver design which utilized multiple IF stages and up conversion through the utilization of a local oscillator and mixer. Because of the multiple IF stages and relatively unstable oscillators, early SCA receivers had a characteristic bandwidth which was not altogether controllable. These receivers consisted of up converting the 67 or 41 kHz frequency to 455 kHz from whence the signal could be amplified, filtered, limited, and ultimately demodulated.

The problems with these early receivers were first that they required a large number of components and typically three to four stages of IF amplification. This required the utilization of numbers of IF transformers which had to be carefully aligned in order to provide the proper bandwidth and the proper phase response. Moreover, the local oscillator utilized in the mixing process oftentimes drifted off frequency. Then unacceptable distortion would arise as well as the introduction of noise. Typically the oscillators utilized in these receivers were free-running LC oscillators.

As mentioned above, tuning multiple IF stages is difficult, especially when one wants a specific bandpass characteristic which minimizes noise, yet preserves or improves fidelity or "brightness".

As is commonly known, if the bandpass response is too narrow one obtains a greater amount of distortion and poor frequency response, but less noise. However if the bandpass response is made relatively wide one obtains less distortion, better fidelity but more noise. A practical compromise must be obtained for optimum performance. In the above prior art systems the alignment procedure determined the passband response of the receiver by adjusting the IF transformers, with as many as four or five adjustments necessary due to the interdependence of the various IF stages. The result even after the most stringent of tuning procedures, left a passband characteristic with sloping sides, e.g. frequency roll off, and only a narrow flat top portion. This resulted in loss of high frequency response, as well as noise and cross talk from subcarriers being introduced into the audio.

Moreover, in the past a technician might take as long as two hours to tune-up a single receiver in order to obtain optimum bandpass response. Because of practical time constraints, he would adjust the bandpass to an acceptable response as he saw fit, rather than take the time to obtain the best results. This resulted in response changes from receiver to receiver, and also the possibility of unauthorized on-site tuning. Moreover, the alignment required a sweep generator, an oscilloscope, and a marker generator, such that the amount of equipment necessary for the alignment of such early receivers was excessive.

Additionally, once aligned it was difficult to ascertain how long the receiver would stay in alignment due to vibration, temperature cycling, aging, humidity and other environmental conditions such as dust and grease. Alignment could be affected in a matter of months in severe environments.

Ideal Receiver Characteristic

It should be noted that an ideal passband characteristic for an SCA receiver would be a flat frequency response within the bandwidth of the SCA signal, with rapid frequency roll off at guardband edges. The prior SCA systems could not approach this ideal characteristic. The aforementioned narrow band systems while eliminating noise, created distortion, whereas a widening of the bandwidth of the receiver made the SCA receiver subject to noise. In the past, the problem with passband shape was compounded by the need for a low group delay time. It is the characteristic of a tuned circuit to have a phase shift from minus 90 degrees through 0 degrees to plus 90 degrees as the frequency passes through resonance. This is because the phase shift of a coil and capacitor are each 90 degrees, but in opposing directions. The frequency at which there is cancellation is resonant frequency. When a number of tuned circuits are cascaded, either in bulk or throughout a receiver, there is a complex sum of all these phase shift curves. If the total phase shift curve for the receiver is not perfectly straight, a "group delay time" will result. This means that an undesired and irregular phase shift will be introduced into the frequency modulated signal as the sidebands pass through this nonlinear area. Because frequency modulation and phase modulation differ only in the distribution of energy in the sidebands, the FM detector responds to the incidental phase shift with the result being distortion. Furthermore, impulse noise, which is a broadband burst of energy, and incidental amplitude components of the SCA signal will be phase modulated by the nonlinear phase response and develop a much larger audio voltage at the output of the FM detector than would otherwise be encountered.

It should be noted that the best frequency response and the best phase linearity do not occur simultaneously in a given filter, but there is a satisfactory compromise between the two and with the appropriate mathematical formulas, an adequate filter network can be designed. When utilizing actual tuned circuits and complex test equipment, it is almost impossible to get every tuned circuit to the exact position where passband response and phase linearity are at their optimum levels.

There is nothing perhaps so annoying as to be listening to a paid-for broadcast in which impulse noise triggered from electrical appliances or the like is injected into the surrounding music background. However with properly aligned IF stages, acceptable but not optimal noise rejection could be achieved. With the group delay time being measured in micro-seconds it will be appreciated that group delay times less than 30 microseconds are desirable. Note, the lower the group delay time the better will be the rejection of impulse noise and the better the performance of the receiver.

Prior Integrated Circuit SCA Receivers

As technology advanced, integrated circuits were developed that could demodulate a signal without special IF transformers. In other words throughout the earlier FM narrow band 455 kHz IF limiter circuit one previously had specialized transformers and the ratio detector transformer that was used in the conversion of the frequency modulation into audio voltages. These transformers were commercially available primarily for 455 kHz signals. However such transformers were not typically available for 67 kHz. It then became popular to reject the superheterodyne approach operating at 455 kHz and to operate the SCA receiver at the subcarrier frequency, while at the same time providing sophisticated filtering and amplification. This eliminated the problem of utilizing a local oscillator because integrated circuits had evolved with sufficient amplification and limiting which reduced the need for multiple IF and limiter stages.

However, the integrated circuit IF systems typically utilized a so-called "bulk filter" that used a set of coils and capacitors ahead of the amplifiers and limiters to separate the SCA signal from noise and all other material being broadcast simultaneously so that only the SCA signal would be amplified, limited and subsequently detected.

A new type of detector was used for new SCA receivers that used a single tuned circuit as a detector element. This particular circuit is called a quadrature detector. Thus as a substitute for the prior superheterodyne circuits which involved sophisticated, alignment procedures, an integrated circuit with amplifiers, limiters and a quadrature detector was used so that it was possible to build relatively inexpensive SCA demultiplexing circuits involving only one integrated circuit. These bulk filters required multiple coils and capacitors to give the bulk filter its particular filter characteristic. The resulting circuit could be characterized as a four pole filter, again exceedingly difficult to tune, and then to no better bandpass response than the prior superheterodyne receivers. Note that in addition to the filters and coils, these subsequent prior SCA receivers also utilized a few bypass capacitors which could not be integrated into an integrated circuit.

While the superheterodyne technique was thus eliminated, numbers of interactive tuned circuits remained, which presented the same types of alignment problems associated with superheterodyne receivers. While the number of tuned circuits shifted to the bulk filter, the alignment procedure became as complicated as that originally associated with the superheterodyne receivers. Thus, in order to align the bulk filter, experienced technicians were required along with the equipment including the aforementioned sweep generators, oscilloscopes and marker generators.

As will be appreciated, the bulk filter in and of itself determined the bandpass response for the entire receiver. Thus, as in this superheterodyne case, it was important and critical that the bulk filter be tuned properly, again a time consuming process and one in which consistency from one receiver to another was not readily achieved.

While in the early SCA receivers the IF stages created the same kind of alignment problems, these stages were distributed throughout the earlier SCA receivers. In the IC SCA receiver, alignment problems are concentrated in the alignment of the bulk filter. The utilization of the bulk filter made for easier design because one could directly couple one LC circuit to another. Since theoretically the coupling determines the bandwidth of the filter, the adjustment of the coils should have required fine tuning of the filter. However what theoretically happens with LC circuits and what practically happens is in conflict. The LC frequency-determining elements in the bulk filter affect each other such that the required bandwidth and group delay times can not be adequately controlled to provide an "ideal" SCA receiver.

The integrated circuit LC-controlled bulk filters resulted in better receivers than heretofore possible because the mixers of the prior art SCA receivers were eliminated. This made the integrated circuit SCA receivers less prone to over-load; and oscillator stability was not a problem since the local oscillator was eliminated.

The alignment of the bulk filter was further complicated because while one can tune the bulk filter to provide the lowest group delay time, one may not achieve the best-shaped Passband for the receiver. Thus, even with proper alignment, the ideal bandpass response could not be achieved.

In summary, the utilization of bulk filters ahead of standard integrated circuit FM detectors, while eliminating the instabilities and high parts count of the superheterodyne circuits, retained alignment problems which could not be solved easily, and did not come close to providing an ideal receiver passband characteristic.

SUMMARY OF THE INVENTION

With the advent of ceramic resonators, the possibility of providing an ideal passband with a low group delay time became possible. The major result when used in an SCA receiver is an order of magnitude improvement in high frequency response, with a resulting "brighter" sound. Additionally, crosstalk and noise is significantly reduced.

A ceramic filter has a totally controlled frequency and phase response. It consists of a network of individual resonators in parallel and series configuration. The operating frequency, bandwidth and group delay time can be precisely controlled by carefully calculating the exact series and parallel resonant frequency of each individual resonator. Once these frequencies have been determined, the manufacturer of the filters can easily make millions of filters with only the slightest variations from unit to unit. It is only necessary for the user to source and terminate the filters with the proper impedance to obtain the manufacturer's filter specifications.

Note that ceramic filters cannot be used in the bulk filter/integrated circuit approach. This is because the high ratio of bandwidth to center frequency required by SCA receivers is beyond the design limitations of this type of filter. The problem with a filter such as a ceramic filter having a high bandwidth to center frequency deals with the characteristic of the basic resonator used to make the filter. The bandwidth of the filter is determined by the difference between the series resonant and parallel resonant frequency of the resonators. Because ceramic resonators are very high-Q devices, a wide difference cannot be obtained. Were one to think of using a ceramic filter at 67 kHz in a bulk filter configuration it could not be made to work because for ceramic filters the maximum ratio of bandwidth to center frequency is 10%, with the requirement for 67 kHz SCA exceeding 20%, eg., 15/67=22%.

However, using a superheterodyne approach, and up-conversion to 455 kHz, the required ratio is less than 4%, eg., 15/455=3.2%. Thus ceramic filters can provide the required ratio for SCA receivers, assuming superheterodyning. At 455 kHz these filters provide optimum performance with a wide selection of bandwidth and other performance characteristics. Thus in the subject system a superheterodyne circuit is used with ceramic resonators, both in the up-conversion and in the bandpass operations.

It should be noted that ceramic resonators use molecular lattice resonance and are thus extremely stable both for the local oscillator and passband operations. The prealigned nature of these devices reduces alignment to a simple broadband input filter and the detector tuning. Even the detector coil could be replaced with a resonator. Alignment takes from 30 seconds to 2 minutes and requires only an SCA generator and distortion analyzer. Even with this quick alignment, there is uniform performance from receiver to receiver.

The result of utilizing ceramic resonator elements both for the oscillator and in the passband provide not only much increased stability for the receiver, but also prevents field tampering which is common with respect to LC-tuned circuits used either in the early superheterodyne SCA receivers or in the aforementioned bulk filters.

What is also coincidentally advantageous about utilizing ceramic resonators is not only can the bandpass for each receiver be tailored and made consistent from one receiver to the next, the SCA frequency can be changed simply by changing the resonators either physically or by utilizing diode switches.

The subject circuit can require a single pole filter ahead of the superheterodyne mixer. The reason that one desires a tuned circuit prior to the mixer of the receiver is that under actual operating conditions, program material on the main channel or stereo can be so strong that it exceeds the dynamic range of the mixer, in this case the IC mixing stage. This means that program material from the main channel or stereo channel can overload the mixer and create harmonics. These harmonics can in fact land within the SCA frequency range and cause interference. This can be eliminated by the placing of a single tuned circuit between the output of the FM tuner's detector and the input to the SCA mixer. By providing a broad bandpass to this circuit to eliminate the strong interfering signals one can achieve the desired result without altering the passband characteristic of the entire receiver due to the complete elimination of LC circuits at critical points.

The improvements associated with the utilization of ceramic frequency determining elements in the SCA receiver are numerous. In the first place there is a consistency of performance from one receiver to another due to the fact that ceramic filters and ceramic frequency determining elements are made to very precise specifications. One does not have to be concerned about alignment of a bulk filter to obtain the proper shape with a very low group delay time. Thus impulse noise which can involve harmonics from the main channel has a higher degree of rejection or less cross talk. Also the subject receiver has very good AM rejection. Moreover, because integrated circuit manufacturers make a combined single integrated circuit including a mixer and an IF amplifier, the receiver can be made both inexpensively and with identical passband characteristics from one receiver to another.

A further advantage to an SCA receiver made through the utilization of ceramic resonator elements is that should a customer want a different type of passband one does not have to re-design the entire receiver. One simply replaces the ceramic filter with another off-the-shelf ceramic filter. Nor does one have to re-educate the technicians for alignment procedures since the subject system is virtually an alignmentless system. The subject SCA receivers are both reliable and tamper proof while at the same time quite easy to manufacture. The only alignment that does take place is the detector coil and the broadband filter input coil which requires typically less than a minute to align and requires only an SCA generator and a distortion analyzer as opposed to the requirement of an oscilloscope a marker generator and a sweep generator. For tuning, all that is required is to tune the detector for maximum audio and then to fine tune the detector and input filter for minimum distortion.

The major advantage of the Subject Circuit is exceptional control for the receiver passband. It is important that all major sidebands of the FM signal fall within the passband of the receiver, but at the same time, there must be high rejection of unwanted signals outside the assigned channel. Achieving this goal previously required many poles of high-Q circuits and then with only a modicum of success. Also, proper alignment was tedious and prohibitive. The use of ceramic filters makes the passband nearly perfect with no alignment and long term stability. It should be noted that sidebands within the signal bandwidth but outside the passband of the receiver are lost in the prior SCA receivers, resulting in a loss of high frequency content and an increase in distortion. These sidebands are picked up by the Subject receiver. Additionally, due to the sharp roll off skirts, noise caused by signals found outside the guard band is almost completely suppressed with the Subject Circuitry.

In summary, an SCA Receiver is provided with improved frequency response, a brighter sound, noise protection, lower distortion, increased stability, less residual subcarrier in the audio, rapid alignment, and more consistent performance from one unit to the next through the utilization of a superheterodyne circuit which up-converts the usual subcarrier signal by mixing it with the output of a ceramic resonator controlled local oscillator/mixer. The ceramic resonator along with the local oscillator/mixer I. C. provides a close to ideal receiver characteristic, with low group delay, improved impulse noise rejection, while nonetheless achieving an increased audio bandwidth. In the manufacturing process, complicated alignment is eliminated which decreases the alignment time from as much as two hours to as little as 30 seconds. Thus a high quality receiver is achieved without prior aligning problems in which phase response was variable due to the use of multiple IF transformers which interact during the alignment procedure.

Additionally the subcarrier component of the SCA signal is eliminated from the audio through the utilization of the superheterodyne circuit operating at 455 kHz, so that subcarrier components are substantially easier to filter out which obviates the necessity of using a trap in the audio output circuit set to the subcarrier frequency. The utilization of ceramic frequency determining elements in combination with integrated circuit oscillators and mixers in a single integrated circuit provides for optimal tailoring of the passband characteristic of the system as well as re-tuning solely by replacement of resonator elements. Thus, the subject system provides a receiver which replaces one having a barely acceptable bandpass response with one that has a nearly ideal bandpass response through a virtually alignmentless system in which group delay and phase effects can be substantially eliminated without sacrificing bandwidth.

BRIEF DESCRIPTION OF THE DRAWINGS

These and other objects of the Subject Invention will be better understood with the Detailed Description taken in conjunction with the Drawings of which.

DETAILED DESCRIPTION

Figure 1A:
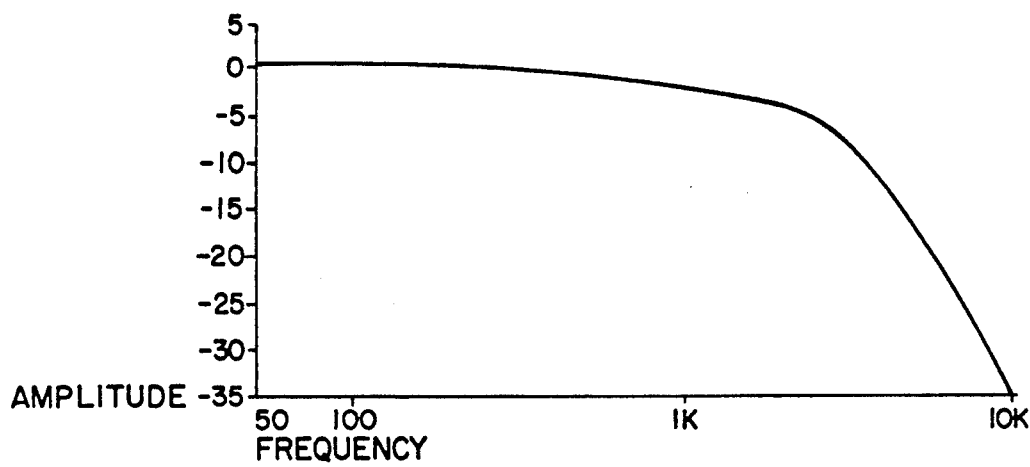
FIG. 1A and 1B are audio frequency response graphs for prior art and the subject SCA receivers, respectively.
Figure 1B:
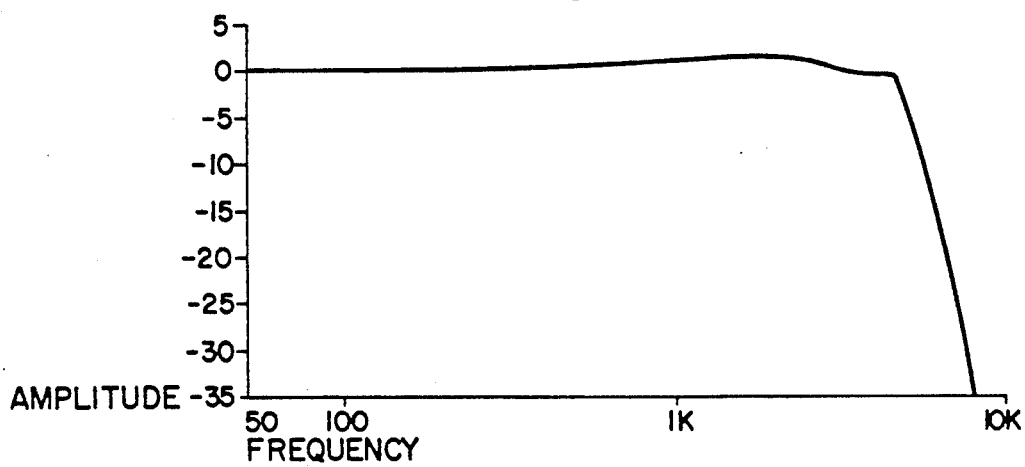

Referring now to FIGS. 1A and 1B, what is presented is the frequency response of prior heterodyned or non-heterodyned SCA receivers versus the Subject receiver. As can be seen from FIG. 1A, the roll off is quite severe starting at about 1 kHz, whereas with the Subject receiver utilizing ceramic frequency determining elements, the roll off is rather sharp and is maintained above the 5 kHz upper limit of conventional SCA systems. The curves illustrate that even with the best of prior art SCA receivers there is some frequency degradation or lack of frequency response in the high end which, coupled with the out of band noise degradation, causes the audibly produced signal to exhibit a dull muddy characteristic. As will be seen, the ability to provide an SCA receiver with an order of magnitude better high frequency response results in a "brighter" reproduced audio signal. As will be further discussed, the ability to achieve this idealized frequency response on a receiver-to-receiver basis is in major part due to the utilization of ceramic resonator elements which, as can be seen from FIG. 2 result in two significant achievements.

Figure 2:
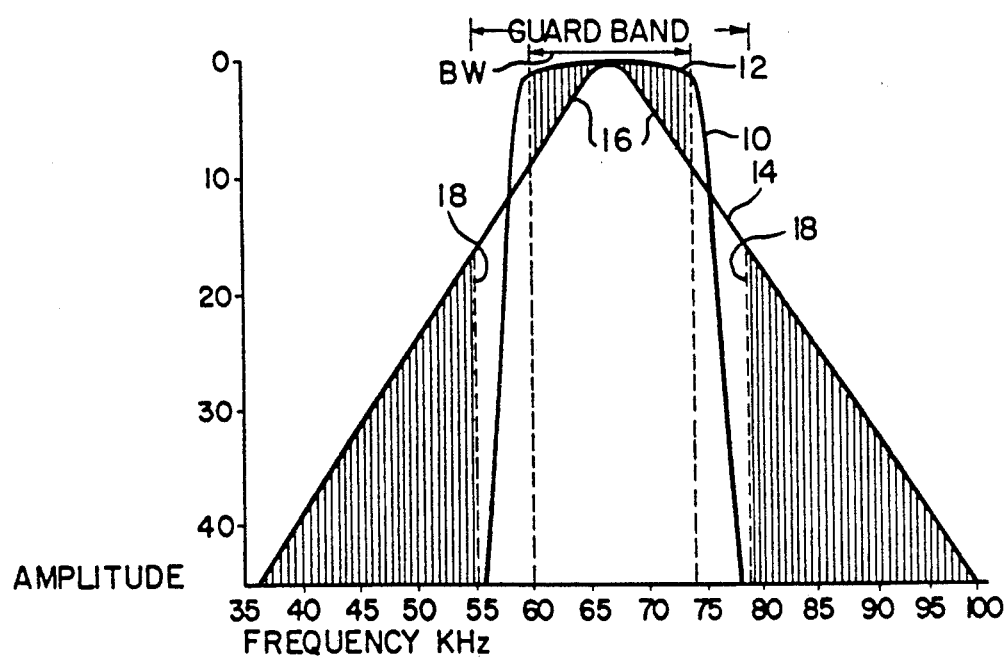
FIG. 2 is a graph of the bandpass response characteristic of prior SCA receivers and that of the Subject SCA receiver, illustrating the added passband response of the Subject SCA receiver for increased high frequency response as well as cross talk and noise rejection for signals outside of a guard band.

Referring now to FIG. 2, as can been seen by the response curve 10 of the Subject System, there is a relatively flat response illustrated at 12 across the entire bandwidth of the signal. This bandwidth is typically set 67 kHz plus or minus 7 kHz for a total bandwidth of 14 kHz.

Referring to the response characteristic of prior receivers, here illustrated by curve 14, what will be seen is that the relatively flat response of the Subject system cannot readily be duplicated by any prior art system. More particularly, the shaded area 16 represents the loss of high frequency response and an increase in distortion for the prior SCA receivers which utilize LC frequency-determining circuitry.

Additionally, the Subject system provides virtual attenuation of signal outside a guard band which, in the illustrated embodiment is defined as 14 kHz removed from the closest subcarrier frequency to the 67 kHz frequency, namely in one embodiment the 92 kHz subcarrier. This provides a guard band at 79.5 kHz on the upper side and 55 kHz on the low side, with the stereo subcarrier ending at 53 kHz. Thus, the guard band typically might be set at 14 kHz away from the upper subcarrier frequency and at least 3 kHz removed from the stereo subcarrier. It will be appreciated that the guard band as defined above is for purposes of explanation only, with the guard band being selected so as to provide a means of defining the requirements for the bandpass response.

Referring again to FIG. 2, it will be appreciated that shaded areas 18 fall outside the guard band, but nonetheless contribute to increased noise and cross talk for demodulated signals. Thus, prior art systems, whether they be heterodyne-oriented or bulk-filter type systems, result in skirts for the bandpass characteristic which lie outside of the guard band, such that signals from various subcarriers or general noise severely affects the fidelity and overall performance of the SCA receiver.

In contradistinction to the bandpass characteristic achievable with tuned circuits having LC components or filters with large numbers of poles, when using ceramic filter elements the ideal passband characteristic illustrated by curve 10 can not only be achieved optimally, but is achievable regularly from receiver to receiver with a minimal amount of tuning, equipment or expertise.

Figure 3:
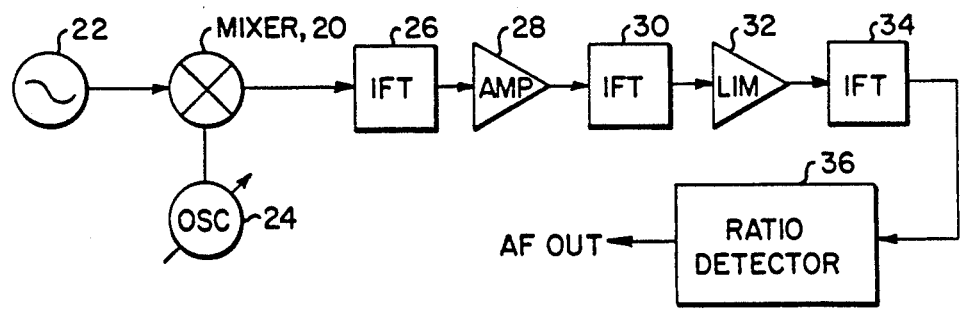
FIG. 3 is a block diagram of a prior art superheterodyne SCA receiver.
Figure 4:
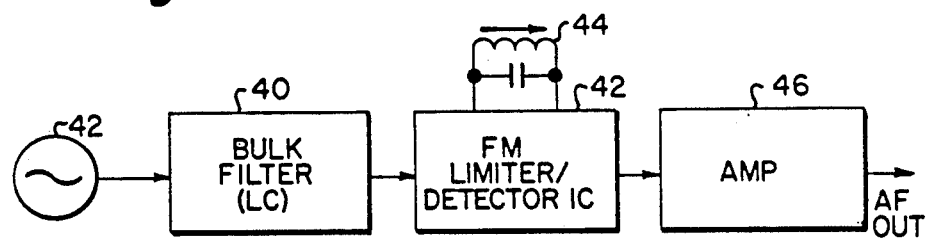
FIG. 4 is a block diagram of a prior art bulk filter/IC SCA receiver.
Figure 5:
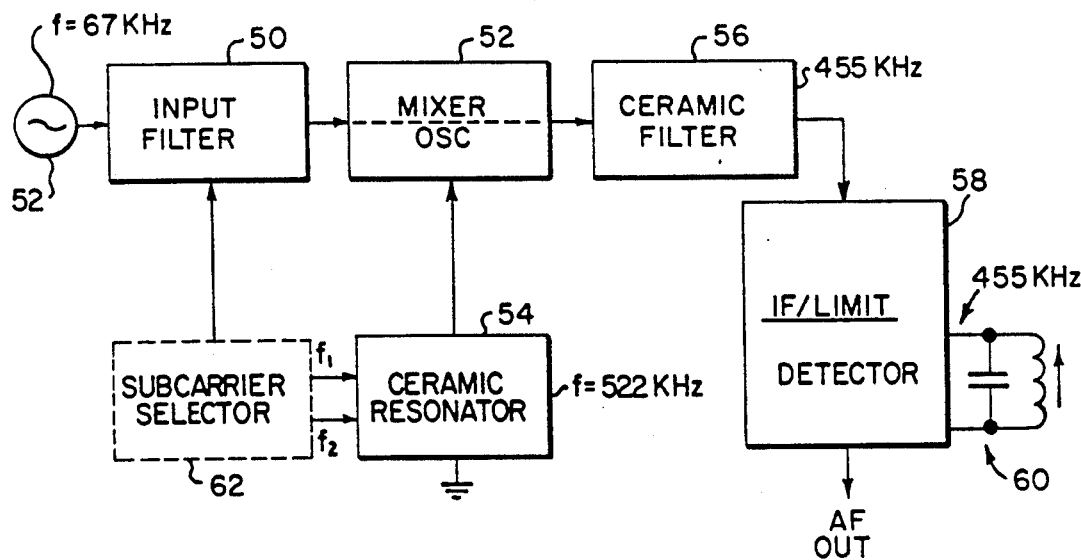
FIG. 5 is a block diagram of the Subject SCA receiver, illustrating the use of ceramic resonator elements to give the SCA receiver an ideal passband; and, FIG. 6 is a schematic diagram of an SCA receiver employing the Subject Invention.

Referring to FIG. 3, as mentioned hereinbefore, the first type of prior art receiver included a mixer 20 having an input signal 22 applied thereto, as well as the output of a variable frequency oscillator 24, which in general was tuned with LC frequency-determining circuits. The output of the mixer was applied to an IF transformer 26, the output of which was amplified at 28 and again applied to an IF transformer 30, the output of which was applied to a limiter 32. The output of limiter 32 was applied to an IF transformer 34 which was part of a conventional ratio detector or discriminator 36. This provided an audio frequency output, having demodulated the incoming signal which constituted recovered audio. This recovered audio suffered in frequency response and in noise immunity primarily due to the lack of ability to provide the overall system with the aforementioned bandpass characteristic. Additionally, it will be appreciated that tuning of such a system required a sweep frequency generator, a marker generator and an oscilloscope, with adjustments to be made to slug-tuned coils both in the variable frequency oscillator, all IF transformers and in the ratio detector. The interplay between the inducive tuned elements required much cut and try tuning in order to obtain a suitable bandpass characteristic.

Additionally, as will be appreciated, the entire prior superheterodyne system can be characterized as a five pole filter, the tuning of which is difficult both from a theoretical and practical position.

In order to eliminate some of the tuning problems with respect to the prior superheterodyne approach, and with the advent of quadrature detectors in IC form, present SCA receivers utilize a single integrated circuit chip which includes many stages of limiting, with the utilization of a so called bulk filter 40 supplied with the input signal 42 and with the bulk filter having LC frequency-determining elements. The output of the bulk filter is typically provided to an FM limiter/detector 42 which is again tuned with an LC circuit here diagmatically illustrated at 44. The output of the FM limiter/detector is applied to an amplifier 46 from which the audio signal is derived. Again the problems of tuning such a system for an ideal bandpass response centers around the number of LC frequency-determining elements associated with the bulk filter and with the FM limiter/detector. Typically, the bulk filter can be characterized as being a two to three pole device with the limiter/detector coil being characterized as a one pole device.

In order to eliminate the problems of tuning associated with the prior art systems described above and more importantly to achieve a reproducible almost ideal bandpass characteristic as described in FIG. 2, the Subject System utilizes an input filter 50 coupled to a signal source 52 which, for discussion has a subcarrier frequency component at 67 kHz. The input filter is a simple single pole LC filter tuned to 67 kHz. The output of the filter is applied to a mixer/oscillator 52 which is available as model NE602 made by Signetics Corporation. The mixer/oscillator is controlled by a ceramic resonator element 54 commercially available as model number CSB522 from Murata Corporation. The frequency, in one embodiment of the ceramic resonator is 522 kHz, which upon mixing with the 67 kHz signal produces an up-converted signal at 455 kHz. The output of mixer/oscillator 52 is applied to a ceramic filter 56 available as model number CFU455E again from Murata Corporation, with a preferred embodiment involving two filters cascaded to provide an absolute attenuation characteristic so as to eliminate any leakage of the local oscillator signal into the limiter/detector, here illustrated by reference character 58.

The 455 kHz from the ceramic filter is applied to IF limiter/detector 58 which is also tuned via an LC circuit 60 to 455 kHz. This IF limiter/detector is commercially available as model number CA3089E available from General Electric Corporation. The output of the IF limiter/detector is applied to a conventional de-emphasis circuit (not shown in this figure) and then to a conventional amplification system (not shown in this figure). The de-emphasis circuit, in addition to its normal noise reduction function, is necessary for the output of the IF limiter/detector because the output of the quadrature detector is the intermediate frequency with a duty cycle that varies with the original audio waveform. The de-emphasis circuit integrates the signal into an audio waveform and removes the IF component from the audio.

As a matter of convenience, it will be appreciated that a subcarrier selector circuit 62 can change the subcarrier frequency by connecting a different ceramic resonator 54 into the circuit and by adding or subtracting capacitance from input filter 50. What will be apparent, however, is that the input filter is a single pole device, whereas the IF limiter detector is also characterizable as a single pole device. What is important is that the tuning involved with respect to the Subject Receiver requires tuning only a single pole device, since the input and the IF limiter/detector are sufficiently isolated that they may be considered as independently operating.

It will therefore be appreciated that what is necessary to obtain the ideal passband characteristic is to select the appropriate ceramic resonator and to merely tune the input filter and the IF limiter/detector utilizing a distortion analyzer and an SCA generator set to 67 kHz in the above example. The system is tuned simply by adjusting the slug-tuned coils in the input filter and the IF limiter/detector for minimum distortion. This takes approximately 30 seconds, with the passband of the receiver being uniquely determined solely by the ceramic resonator which is available in a wide assortment of bandwidths selectable by the designer. This means that the subject SCA receiver can be utilized in a wide variety of applications with various subcarrier frequency requirements without having to redesign the entire system for an optimal bandpass response. It will be appreciated that the mixer/oscillator and the IF limiter/detector is currently available as a single integrated circuit manufactured by Motorola, Inc. as model no. MC3357, MC3359 and MC3361.

Figure 6:
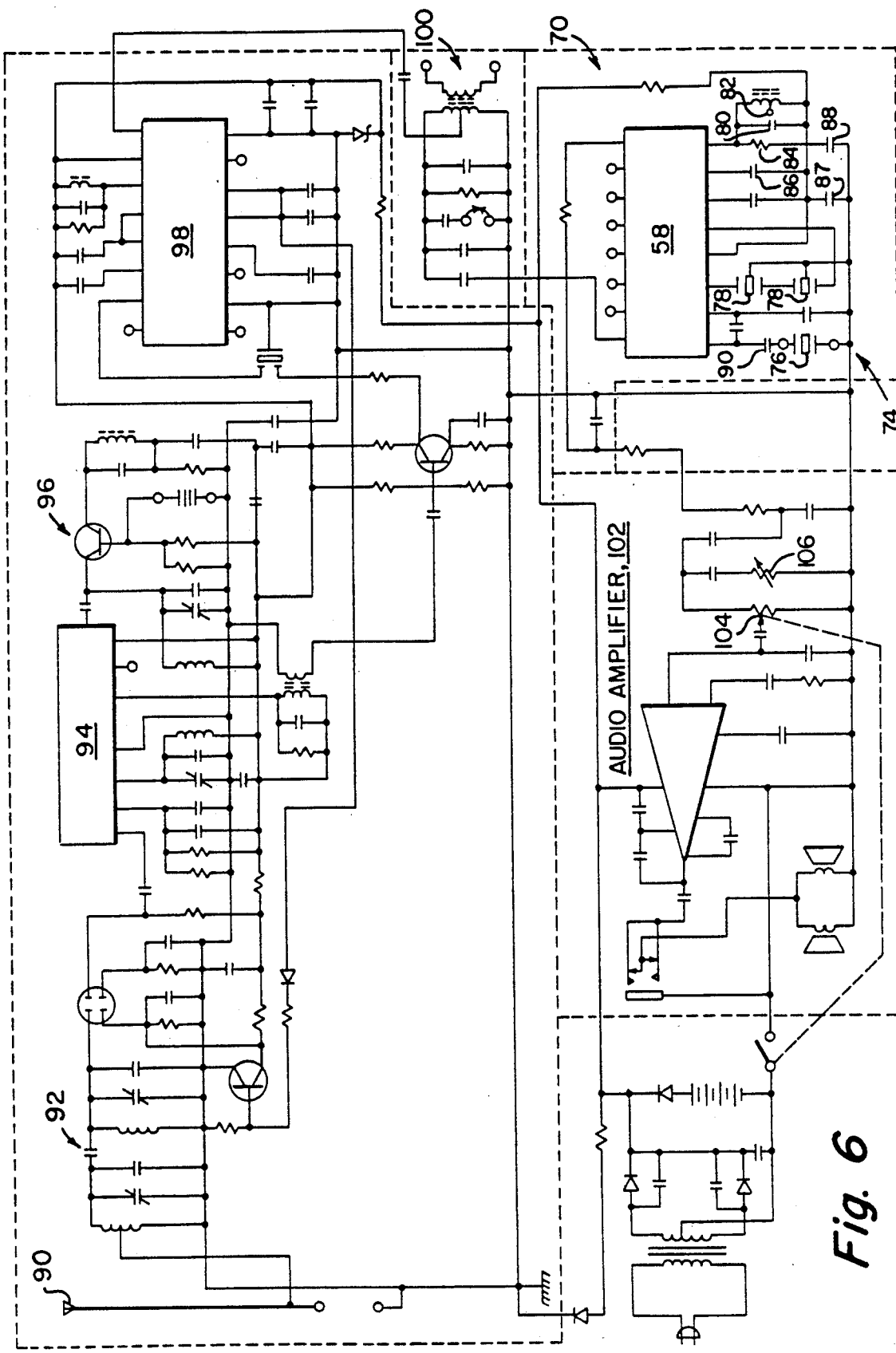

Referring now to FIG. 6 the SCA receiver DEMUX section, here illustrated by reference character 70, includes such an integrated circuit 72 connected to a local ceramic oscillator 74 having a ceramic element 76, in this embodiment tuned to 522 kHz. The ceramic filter portion of the circuit is defined by dual ceramic filter elements 78 which are set to 455 kHz. Limiter/detector 58 in this case has its frequency determined by LC circuit elements 80, 82 and 84. Capacitors 86 are merely bypass capacitors. The electrolytic capacitor 87 serves to decouple power supply components from the SCA demux. Capacitors 88 provide the appropriate feedback path within the oscillator, whereas capacitor 90 provides the appropriate load capacitance for the resonator.

Having discussed the single IC approach to the implementation of the SCA DEMUX section, it will be appreciated that what is shown in FIG. 6 is a complete SCA receiver which includes an antenna 90 coupled to an RF amplifier 92 which is in turn coupled to a doubly balanced mixer 94 driven by an oscillator 96 set by a crystal 97 to 99.5 mHz in one embodiment. The elements of the FM tuner are conventional, with the output of the mixer being applied to an FM IF system 98, which includes a limiter/detector and audio preamplifier, the output of which is coupled to an input filter 100, which is then coupled to input terminal 16 of the integrated circuit limiter/detector 58. This input goes to the input of the mixer portion of this circuit. The output of the SCA DEMUX section is applied to an audio amplifier 102 which also is conventional. It will be noted that audio amplifier 102 has a volume control 104 and a tone control 106 as illustrated.

Having above indicated a preferred embodiment of the present invention, it will occur to those skilled in the art that modifications and alternatives can be practiced within the spirit of the invention. It is accordingly intended to define the scope of the invention only as indicated in the following claims:

I claim:

1. A superheterodyne subcarrier FM receiver operating in the 53-100 KHz SCA band for receiving music and voice transmission comprising:
   means for detecting a signal having a carrier and an FM-modulated subcarrier, said subcarrier having a first predetermined frequency;
   input filter means tuned to said subcarrier having a first predetermined frequency;
   an oscillator providing a fixed frequency output signal having a second predetermined frequency, said oscillator including a ceramic resonator;
   means for heterodyning said filtered subcarrier signal with said output signal so as to produce a resultant signal having a third predetermined frequency;
   ceramic bandpass filter means having a bandwidth commensurate with said music and voice transmission, said filter means tuned to said third predetermined frequency and coupled to the output of said heterodyning means for producing a filtered output signal; and,
   FM demodulating means coupled to the output of said bandpass filter for demodulating said last-mentioned output signal to retrieve the audio components thereof such that the use of said ceramic resonator and said ceramic bandpass filter provides a receiver bandpass characteristic for low group delay, improved impulse noise rejection and improved high-end audio frequency response due to a resulting flat receiver bandpass response over the signal bandwidth.

2. An SCA FM receiver comprising:
   means for heterodyning a received signal with a fixed frequency signal;
   a local oscillator for generating said fixed frequency signal including a ceramic resonator controlled oscillator;
   a ceramic bandpass filter coupled to said heterodyning means to provide the receiver with a passband commensurate with music and voice transmission and,
   demodulation means coupled to said ceramic bandpass filter such that the use of said ceramic bandpass filter and said ceramic resonator in the receiving circuitry provides said receiver with a passband characteristic for improved sound quality, low group delay, improved impulse noise rejection and improved high-end audio frequency response due to a resulting flat receiver bandpass response over the signal bandwidth.

3. The receiver of claim 2 wherein said passband characteristic includes a flat passband response within the bandwidth of the SCA signal and rapid roll off of greater than 30 dB within 5 kHz.

4. The SCA receiver of claim 2 wherein the heterodyning circuitry includes no LC-tuned frequency-conversion or bandpass circuits.

5. An SCA FM receiver for receiving music and voice transmission and having a fixed frequency heterodyning circuit including frequency-conversion and bandpass filter circuits, said frequency conversion circuit having only a ceramic resonator as a frequency determining element and said bandpass filter circuit having only a ceramic resonator as a frequency determining element, with said ceramic resonators providing a bandpass characteristic for low group delay, improved impulse noise rejection and improved high-end audio frequency response due to a resulting flat receiver bandpass response over the signal bandwidth commensurate with SCA music and voice transmission.

6. The receiver of claim 5 wherein said bandpass filter circuit has a maximum ratio of bandwidth to center frequency of less than 4% due to the use of said ceramic resonators.

7. The SCA receiver of claim 6 wherein said receiver is substantially prealigned due to the use of said ceramic resonators.

8. A pretuned SCA FM receiver comprising:
   a heterodyne circuit for receiving a signal and including a ceramic resonator controlled fixed frequency oscillator;
   a ceramic bandpass filter coupled to the output of said heterodyne circuit and having a bandwidth commensurate with music and voice transmission; and,
   demodulation means coupled to the output of said bandpass filter, whereby said receiver is pretuned through the utilization of said ceramic bandpass filter and said ceramic resonator, with said ceramic bandpass filter and said ceramic resonator providing a receiver bandpass characteristic for low group delay, improved impulse noise rejection and improved high-end audio frequency response due to a resulting flat receiver bandpass response over the signal bandwidth.

9. A superheterodyne SCA FM receiver for receiving music and voice transmission comprising:
   means for detecting a signal having a carrier and an FM-modulated subcarrier, said subcarrier having a first predetermined frequency;
   a fixed frequency oscillator providing an output signal having a second predetermined frequency, said oscillator including a ceramic resonator;
   means for heterodyning said detected subcarrier signal with said oscillator output signal so as to produce a resultant signal having a third predetermined frequency;
   ceramic bandpass filter means tuned to said third predetermined frequency and coupled to the output of said heterodyning means for producing a filtered output signal; and,
   FM demodulating means coupled to said filtered output signal to retrieve the audio components thereof such that the use of said ceramic bandpass filter and said ceramic resonator provides a receiver bandpass characteristic for low group delay, improved impulse noise rejection and improved high-end audio frequency response due to a resulting flat receiver bandpass response over the signal bandwidth.

* * * * *